(12) United States Patent
Oki et al.

(10) Patent No.: US 10,684,405 B2
(45) Date of Patent: Jun. 16, 2020

(54) SIDE-EDGE TYPE SURFACE LIGHT EMITTING APPARATUS HAVING LIGHT GUIDE PLATE SANDWICHED BY UPPER AND LOWER PRISM SHEETS

(71) Applicant: STANLEY ELECTRIC CO., LTD., Meguro-ku, Tokyo (JP)

(72) Inventors: Yoji Oki, Tokyo (JP); Lingwei Goh, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/393,297

(22) Filed: Apr. 24, 2019

(65) Prior Publication Data

US 2019/0369319 A1 Dec. 5, 2019

(30) Foreign Application Priority Data

May 31, 2018 (JP) .................. 2018-105022

(51) Int. Cl.
*G02B 6/00* (2006.01)
*F21V 8/00* (2006.01)

(52) U.S. Cl.
CPC .................. *G02B 6/0053* (2013.01)

(58) Field of Classification Search
CPC .................................................. G02B 6/0053
USPC ........................................................ 362/606
See application file for complete search history.

(56) References Cited

U.S. PATENT DOCUMENTS

| 5,890,791 | A   | * | 4/1999  | Saito    | G02B 6/0053 362/330 |
| 7,165,874 | B2  | * | 1/2007  | Nagakubo | G02B 6/0055 349/65  |
| 2006/0256581 | A1 | * | 11/2006 | Hwang    | G02B 6/0038 362/619 |
| 2008/0055926 | A1 | * | 3/2008  | Yamashita | G02B 5/0215 362/606 |
| 2009/0086509 | A1 |   | 4/2009  | Omori et al. | |
| 2012/0235891 | A1 | * | 9/2012  | Nishitani | G02B 3/0056 345/102 |
| 2016/0054508 | A1 | * | 2/2016  | Hirayama | G02B 6/0038 349/65  |
| 2017/0205558 | A1 | * | 7/2017  | Hirayama | G02B 6/00 |

FOREIGN PATENT DOCUMENTS

| JP | 2005142078 A | 6/2005 |
| JP | 2009081094 A | 4/2009 |
| JP | 2009277388 A | 11/2009 |

* cited by examiner

*Primary Examiner* — Christopher M Raabe
(74) *Attorney, Agent, or Firm* — Holtz, Holtz & Volek PC (57) ABSTRACT

A side-edge type surface light emitting apparatus includes: a light guide plate having a first light emitting surface, a light distribution controlling surface opposing the first light emitting surface and a light incident surface; a light source disposed on the light incident surface; a first prism sheet having multiple first prisms opposing the first light emitting surface and a second light emitting surface opposing the multiple first prisms; a light absorbing sheet opposing the light distribution controlling surface; and a second prism sheet having a flat surface opposing the light distribution controlling surface and multiple second prisms opposing the light absorbing sheet, the multiple second prisms being perpendicular to the light incident surface of the light guide plate.

10 Claims, 15 Drawing Sheets

SIDE-EDGE TYPE SURFACE LIGHT EMITTING APPARATUS HAVING LIGHT GUIDE PLATE SANDWICHED BY UPPER AND LOWER PRISM SHEETS

This application claims the priority benefit under 35 U.S.C. § 119 to Japanese Patent Application No. JP2018-105022 filed on May 31, 2018, which disclosure is hereby incorporated in its entirety by reference.

BACKGROUND

Field

The presently disclosed subject matter relates to a side-edge type surface light emitting apparatus.

Description of the Related Art

A side-edge type surface light emitting apparatus, which is constructed by a light guide plate with multiple light emitting elements such as light emitting diode (LED) elements disposed on the side thereof, has broadly been used as a backlight for a display unit such as a liquid crystal display (LCD) unit in terms of its thin and light structure. When the display unit is used in a public place, a narrow light distribution characteristic or a narrow-viewing characteristic is required to prevent others from viewing the display unit from the side. This is called the privacy effect.

A prior art side-edge type surface light emitting apparatus is constructed by a double-face prism light guide plate having alight emitting surface and a light distribution controlling surface opposing the light emitting surface, a light incident surface on sides of the light emitting surface and the light distribution controlling surface, multiple LED elements disposed on the light incident surface of the light guide plate, a single-face prism upper prism sheet including prisms along one direction in parallel with the light incident surface disposed on the light emitting surface of the light guide plate, and a light absorbing sheet (black sheet) disposed on the light distribution controlling surface of the light guide plate (see: JP2009-277388A). Since the light absorbing sheet absorbs light leaked from the light distribution controlling surface of the light guide plate, the leaked light hardly returns to the light guide plate, so that the privacy effect can be improved as illustrated in FIG. 1.

Figure 1:
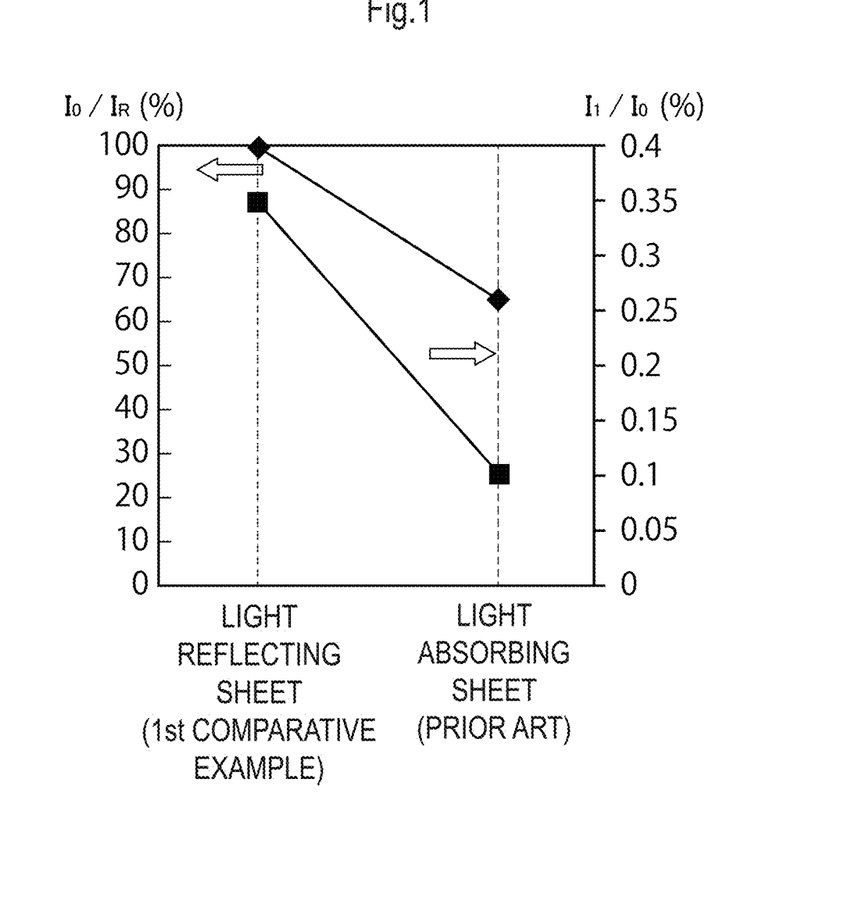
FIG. 1 is a graph showing the luminous intensity and privacy effect in a prior art side-edge type surface light emitting apparatus as compared with a first comparative example apparatus.

In FIG. 1, in a first comparative example apparatus where a light reflecting sheet (white sheet) is used instead of the light absorbing sheet, the luminous intensity $I_R$ at the azimuth $\theta=0°$ on the light emitting surface of the upper prism sheet is defined as 100%. Also, the privacy effect $I_1/I_0$ (%) is defined by the luminous intensity $I_1$ at the azimuth $\theta=\pm35°$ on the light emitting surface of the upper prism sheet relative to the luminous intensity $I_0$ at the azimuth $\theta=0°$ on the light emitting surface of the upper prism sheet.

In the above-described prior art side-edge type surface light emitting apparatus, as illustrated in FIG. 1, as compared with the first comparative side-edge type surface light emitting apparatus having the light reflecting sheet, the privacy effect can be improved, however, since the light absorbing sheet absorbs the light leaked from the light guide plate, the luminous intensity would be decreased.

SUMMARY

The presently disclosed subject matter seeks to solve one or more of the above-described problems.

According to the presently disclosed subject matter, a side-edge type surface light emitting apparatus includes: a light guide plate having a first light emitting surface, a light distribution controlling surface opposing the first light emitting surface and a light incident surface on sides of the first light emitting surface and the light distribution controlling surface; a light source disposed on the light incident surface of the light guide plate; a first prism sheet having multiple first prisms opposing the first light emitting surface of the light guide plate and a second light emitting surface opposing the multiple first prisms; a light absorbing sheet opposing the light distribution controlling surface of the light guide plate; and a second prism sheet having a flat surface opposing the light distribution controlling surface of the light guide plate and multiple second prisms opposing the light absorbing sheet, the multiple second prisms being perpendicular to the light incident surface of the light guide plate.

According to the presently disclosed subject matter, due to the presence of the second prism sheet, the privacy effect can be improved, and simultaneously, the luminous intensity can be increased.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIG. 18A is a diagram showing the relative light distributions of the LCD unit of FIG. 17 when the light modulation element is turned on.

DETAILED DESCRIPTION OF EXEMPLARY EMBODIMENTS

Figure 2:
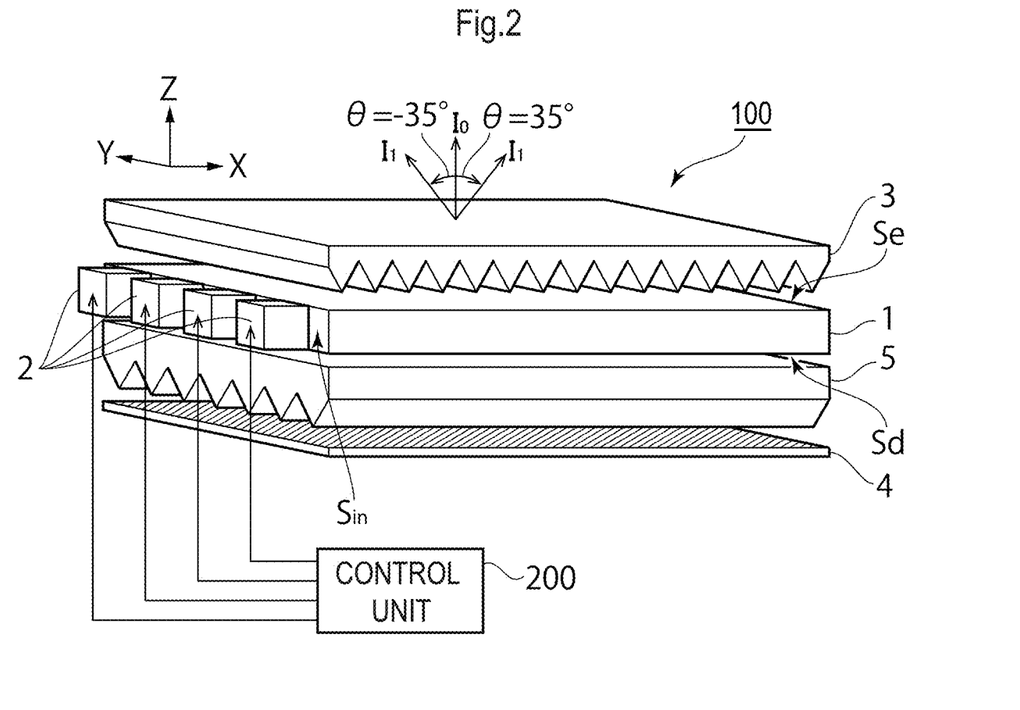
FIG. 2 is a perspective view illustrating a first embodiment of the side-edge type surface light emitting apparatus according to the presently disclosed subject matter.

FIG. 2 is a perspective view illustrating a first embodiment of the side-edge type surface light emitting apparatus according to the presently disclosed subject matter.

In FIG. 2, a side-edge type surface light emitting apparatus 100 is constructed by a double-face prism light guide plate 1 having a light emitting surface $S_e$, a light distribution controlling surface $S_d$ opposing the light emitting surface $S_e$, a light incident surface $S_{in}$ on the sides of the light emitting surface $S_c$ and the light distribution controlling surface $S_d$, multiple LED elements 2 disposed on the light incident surface $S_{in}$, a single-face prism upper prism sheet 3 disposed on the light emitting surface $S_e$, a light absorbing sheet (black sheet) 4 disposed on the side of the light distribution controlling surface $S_d$, and a single-face prism lower prism sheet 5 disposed between the light guide plate 1 and the light absorbing sheet 4.

The light absorbing sheet 4 is made of polyethylene terephthalate (PET) colored by black pigment. As occasion demands, the surface of the light absorbing sheet 4 is dull-finished.

The LED elements 2 are driven by a control unit 200 which is constructed by a microcomputer or the like.

In the side-edge type surface light emitting apparatus 100 of FIG. 2, when light is introduced from the LED elements 2 into the light guide plate 1, a first part of the light is emitted from the light emitting surface $S_e$ through the upper prism sheet 3 to the outside. On the other hand, a second part of the light may leak from the light distribution controlling surface $S_d$ to the lower prism sheet 5. In this case, the lower prism sheet 5 returns a part of the second part of the light to the light guide plate 1, so that only the remainder of the second part of the light is absorbed by the light absorbing sheet 4. As a result, the luminous intensity $I_0$ at the azimuth $\theta=0°$ can be increased, and simultaneously, the luminous intensity $I_1$ at the azimuth $\theta=35°$ or $-35°$ can be decreased to improve the privacy effect, which will be explained later.

The light guide plate 1 will be explained next with reference to FIGS. 3, 4, 5A, 5B and 6.

Figure 3:
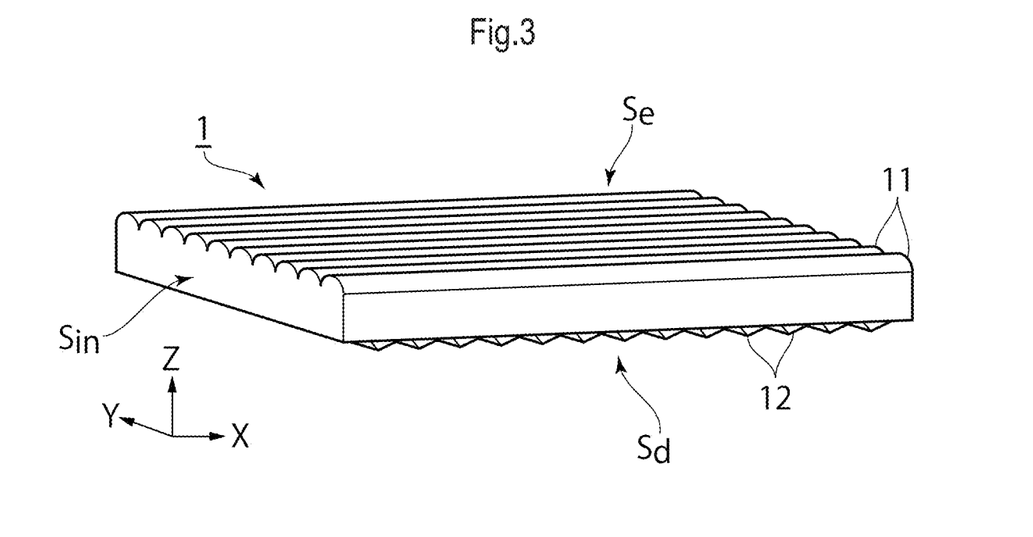
FIG. 3 is a perspective view of the light guide plate of FIG. 2.

In FIG. 3, which is a perspective view of the light guide plate 1 of FIG. 2, the light guide plate 1 is made of a transparent material such as acryl resin or polycarbonate resin. The light guide plate 1 is of a double prism type which has multiple upper-side prisms 11 along the X-direction (light propagation direction) perpendicular to the light incident surface $S_{in}$ on the light emitting surface $S_e$ and multiple lower-side prisms 12 along the Y-direction in parallel with the light incident surface $S_{in}$ on the light distribution controlling surface $S_d$. When light from the LED elements 2 (see: FIG. 2) is incident to the light incident surface $S_{in}$, the light propagates through the interior of the light guide plate 1, so that the light is reflected by the prisms 12 toward the prisms 11 to emit the light from the light emitting surface $S_e$.

Figure 4:
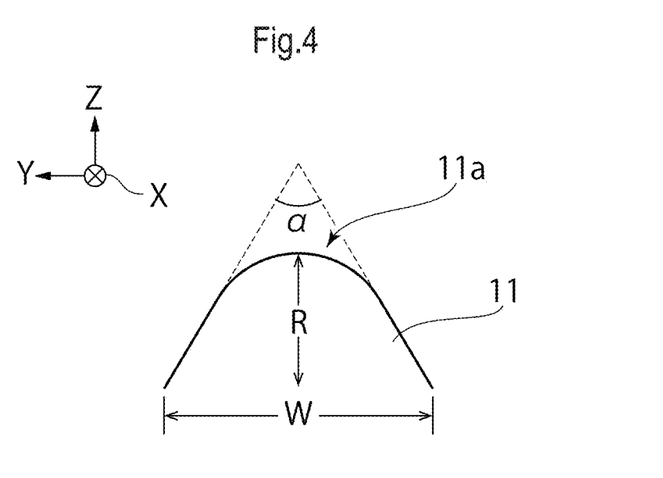
FIG. 4 is a cross-sectional view of one of the upper-side prisms of FIG. 3.

As illustrated in FIG. 4, which is a cross-sectional view of one of the prisms 11 of FIG. 3, the prisms 11 protrude along the positive side of the Z-direction, i.e., they are convex. In more detail, each of the prisms 11 has a cross section of an isosceles triangle having an apical angle α of 80° to 110° with a rounded tip 11a having a curvature radius R of 0 to 25 μm. Also, the width W of each of the prisms 11 is about 50 μm. The width W, the curvature radius R and the apical angle α are adjusted in accordance with a required distribution characteristic of the side-edge type surface light emitting apparatus 100, which will be later explained.

Note that the cross section of each of the prisms 11 can be other shapes such as a semicircular shape or a trapezoidal shape. Also, the prisms 11 can be formed by semi-sperical convexities alternating with semi-sperical concavities two-dimensionally arranged in an XY-plane. Further, the prisms 11 can be formed by polygonal pyramids two-dimensionally arranged in an XY-plane.

Figure 5A:
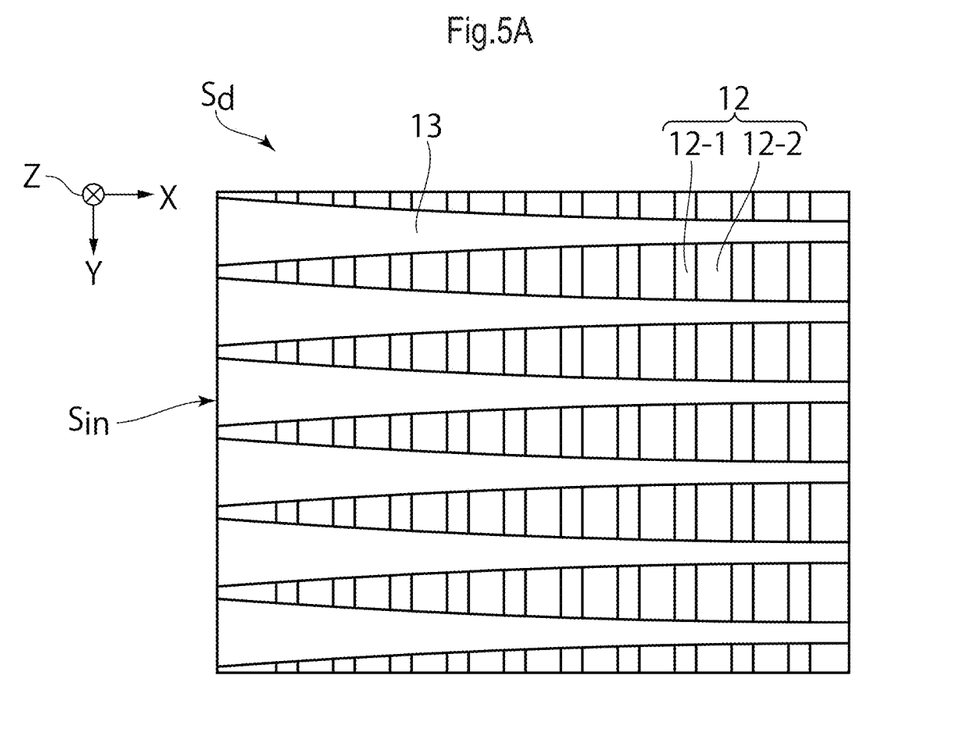
FIG. 5A is a bottom view of the lower-side prisms of FIG. 3.
Figure 5B:
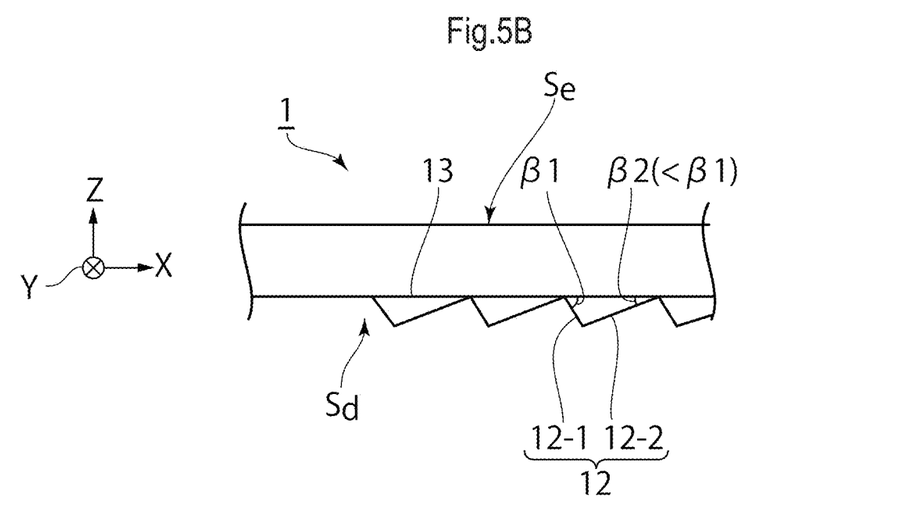
FIG. 5B is a partial cross-sectional view of FIG. 5A.

In FIG. 5A, is a bottom view of the lower-side prisms 12 of FIG. 3, and in FIG. 5B, which is a partial cross-sectional view of FIG. 5A (see: JP2009-081094A & US Patent Application Publication No. 2009/0086509A1), multiple flat mirror finishing surfaces 13 are provided on the light distribution controlling surface $S_d$ along the X-direction, in order to spread light to the inner part of the light guide plate 1. The farther from the light incident surface $S_{in}$ the flat mirror finishing surfaces 13 are located, the smaller the width of the flat mirror finishing surfaces 13 along the Y-direction at that location. The sequences of the prisms 12, each including a sloped surface 12-1 with a large angle β1 and a sloped surface 12-2 with a small angle β2 (<β1), are provided between the flat mirror finishing surfaces 13. The farther from the light incident surface $S_{in}$ the prisms 12 are located, the larger the width of sequences of the prisms 12 along the Y-direction at that location.

Figure 6:
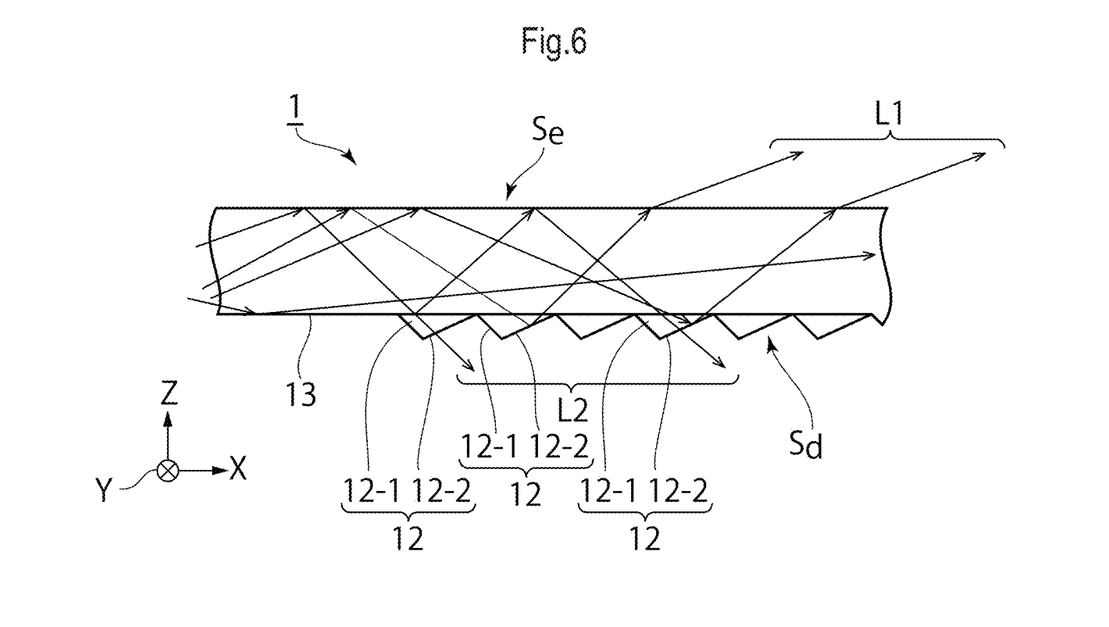
FIG. 6 is a cross-sectional view for explaining the operation of the light guide plate of FIG. 2.

In FIG. 6, which is a cross-sectional view for explaining the operation of the light guide plate 1 of FIG. 2, some light is totally-reflected between the light emitting surface $S_e$ and the light distribution controlling surface $S_d$, and then is refracted at the first light emitting surface $S_e$ or the sloped surface 12-2 of one of the prisms 12. In this case, since the width of the flat mirror finishing surfaces 13 and the width of the prisms 12 along the Y-direction are changed along the X-direction, the surface luminous intensity within the light emitting surface $S_e$ of the light guide plate 1 can be uniform. Thus, some light L1 emitted from the light emitting surface $S_e$ is neither disturbed nor diffused, but is refracted at a definite angle with respect to the normal line of the light emitting surface $S_e$. On the other hand, some light L2 is leaked from the light distribution controlling surface $S_d$ of the light guide plate 1 to the light absorbing sheet 4.

Figure 7:
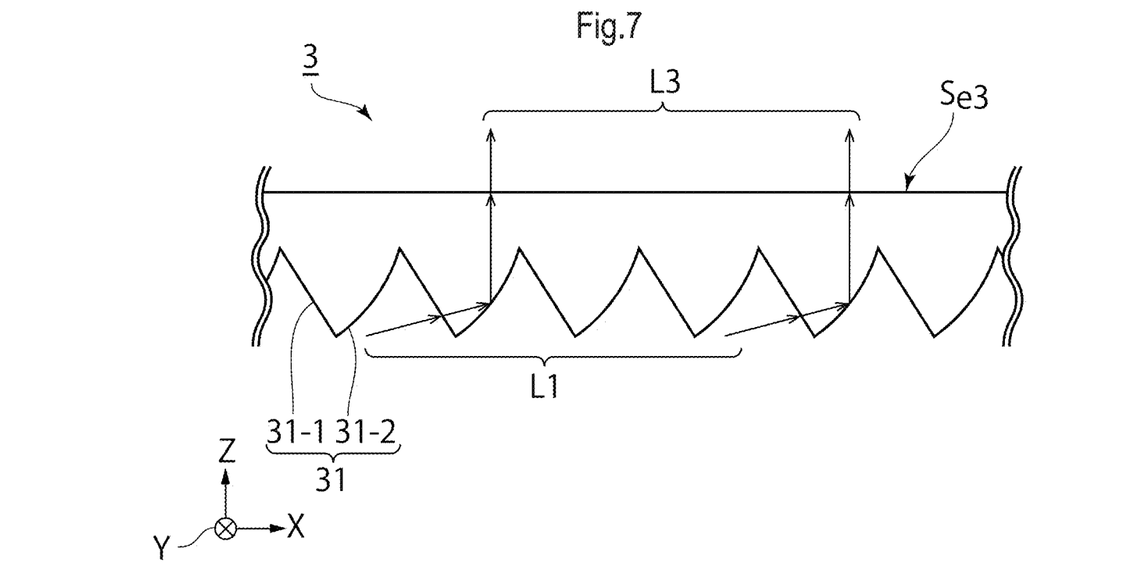
FIG. 7 is a cross-sectional view of the upper prism sheet of FIG. 2.

In FIG. 7, which is a cross-sectional view of the upper prism sheet 3 of FIG. 2 (see: FIG. 8 of JP 2005-142078A), the upper prism sheet 3 is constructed by a series of equidistantly-disposed, deformed-triangular prisms 31 in parallel with the light incident surface $S_{in}$ (see: FIG. 2), and each of the prisms 31 has a straight-sloped surface 31-1 on the side of the light incident surface $S_{in}$ and a curved-sloped surface 31-2 on the opposite side of the light incident surface $S_{in}$. The prisms 31 oppose the light emitting surface $S_e$ of the light guide plate 1. The width of the prisms 31 is about 50 μm, for example. When the light L1 with an inclined direction from the light emitting surface $S_e$ of the light guide plate 1 is incident to the prisms 31 of the upper prism sheet 3, the light L1 is refracted at the straight-sloped surface 31-1 and then, is totally-reflected by the curved-sloped surface 31-2, so that light L3 normal to the flat light emitting surface $S_{e3}$ of the upper prism sheet 3 is emitted therefrom. Note that the curved-sloped surface 31-2 can be straight-sloped, splined-sloped or parabolic-sloped.

Figure 8:
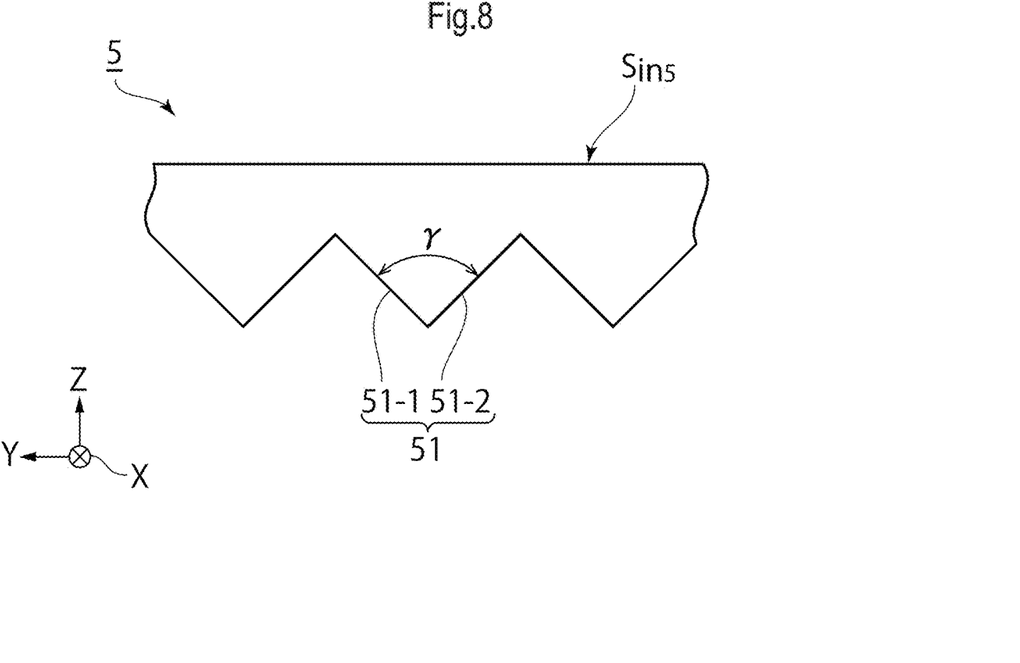
FIG. 8 is a cross-sectional view of the lower prism sheet of FIG. 2.

In FIG. 8, which is a cross-sectional view of the lower prism sheet 5 of FIG. 2, the lower prism sheet 5 is constructed by a series of equidistantly-disposed, triangular prisms 51 perpendicular to the light incident surface $S_{in}$ (see: FIG. 2), and each of the prisms 51 has symmetrical straight-sloped surfaces 51-1 and 51-2 along the Y-direction. The prisms 51 oppose the light absorbing sheet 4. In this case, the apical angle γ between the straight-sloped surfaces 51-1 and 51-2 is 90°, for example.

Figure 9:
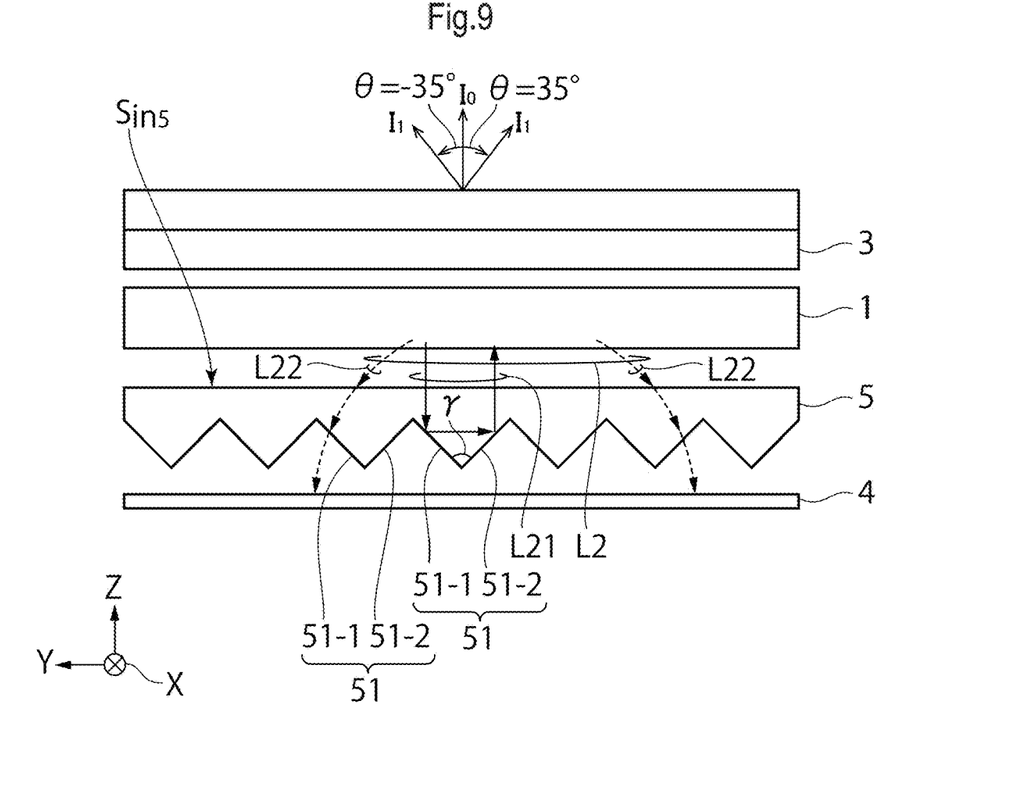
FIG. 9 is a cross-sectional view for explaining the operation of the lower prism sheet of FIG. 8.

In FIG. 9, which is a cross-sectional view for explaining the operation of the lower prism sheet 5 of FIG. 8, the light L2 leaked from the light distribution controlling surface $S_d$ of the light guide plate 1 is incident to the flat light incident surface $S_{in5}$ of the lower prism sheet 5.

The light L21 of the light L2, which has a relatively small incident angle to the flat light incident surface $S_{in5}$ of the lower prism sheet 5, is totally-reflected by the straight-sloped surfaces 51-1 and 51-2 of the triangle prism 51 and returns to the light guide plate 1. In this case, the incident angle of the light L21 to the straight-sloped surfaces 51-1 or 51-2 is larger than the critical angle of the lower prism sheet 5, so that the light L21 is totally-reflected by the straight-sloped surfaces 51-1 and 51-2 to return to the light guide plate 1. As a result, 90% or more of the light L2 can be emitted from the upper prism sheet 3 at the azimuth θ between −35° and 35°, which would enhance the luminous intensity $I_0$ at the azimuth θ=0°.

On the other hand, the light L22 of the light L2, which has a relatively large incident angle to the flat light incident surface $S_{in5}$ of the lower prism sheet 5, is refracted at the straight-sloped surface 51-1 or 51-2 of the triangle prisms 51 and propagates to the light absorbing sheet 4. In this case, the incident angle of the light L22 to the straight-sloped surface 51-1 or 51-2 is smaller than the critical angle of the lower prism sheet 5. This would decrease the luminous intensity $I_1$ at the azimuth θ=35° and −35°, i.e., enhance the privacy effect.

In FIGS. 8 and 9, the prisms 51 are arranged along the X-direction; however, the angle between the direction of the prisms 51 and the X-direction can be smaller than 45°, preferably, smaller than 20°.

Figure 10:
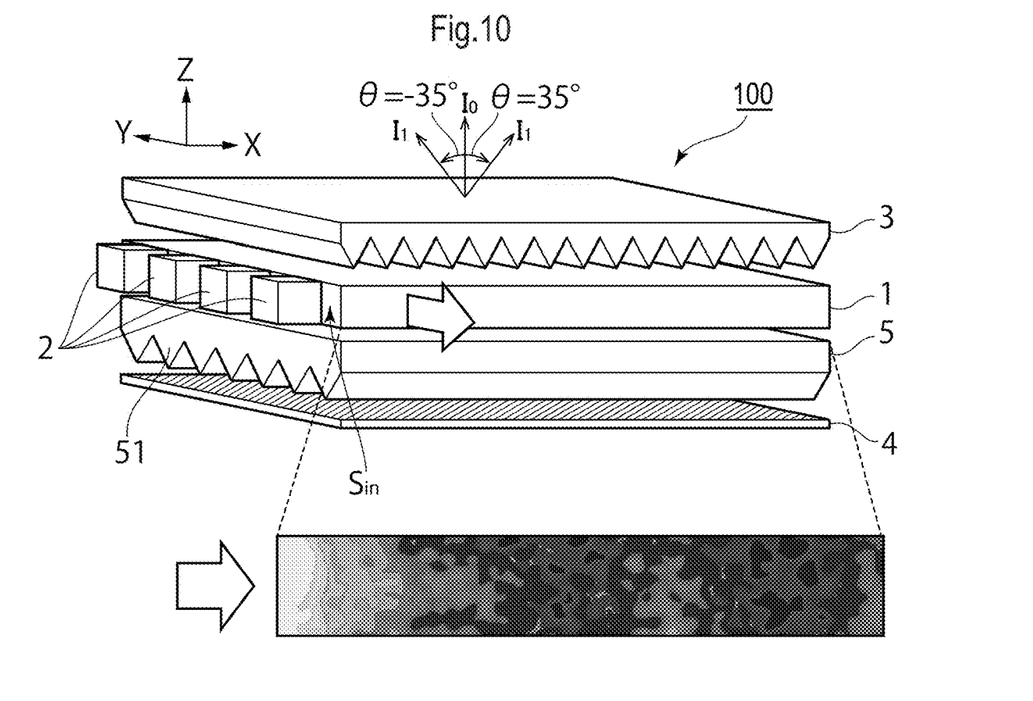
FIG. 10 is a diagram showing a visual light distribution of the side-edge type surface light emitting apparatus of FIG. 2.

In FIG. 10, which shows a visual light distribution of the side-edge type surface light emitting apparatus 100 of FIG. 2 where the prisms 51 of the lower prism sheet 5 is disposed along the X-direction, i.e., perpendicular to the light incident surface $S_{in}$, the luminous intensity I is large in the center portions and the fluctuation of the luminous intensity I is relatively small.

Figure 11:
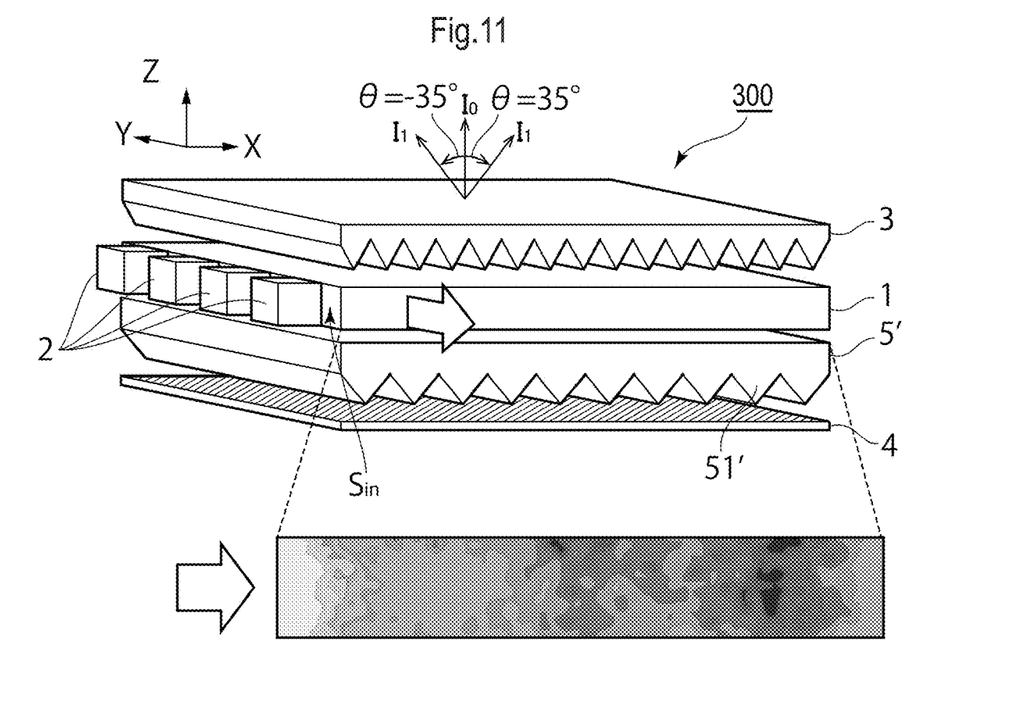
FIG. 11 is a diagram showing a visual light distribution of a second comparative example of a side-edge type surface light emitting apparatus.

On the other hand, in FIG. 11, which shows a visual light distribution of a second comparative example apparatus 300 where prisms 51' of a lower prism sheet 5' is disposed along the Y-direction, i.e., in parallel with the light incident surface $S_{in}$, the luminous intensity I is small in the center portions and the fluctuation of the luminous intensity I is relatively large.

Figure 12A:
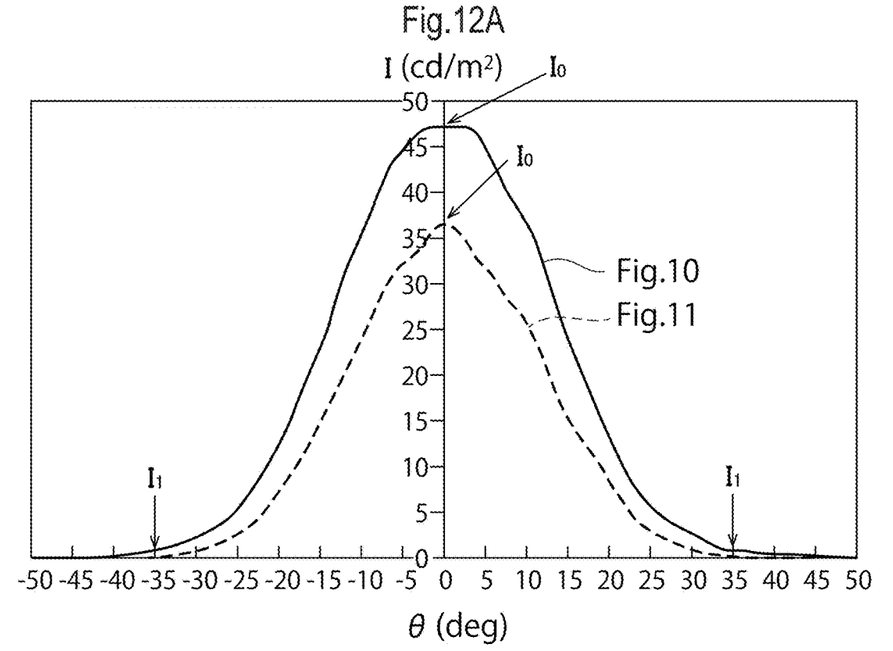
FIG. 12A is a diagram showing the light distributions of FIGS. 10 and 11 represented by the absolute luminous intensity.
Figure 12B:
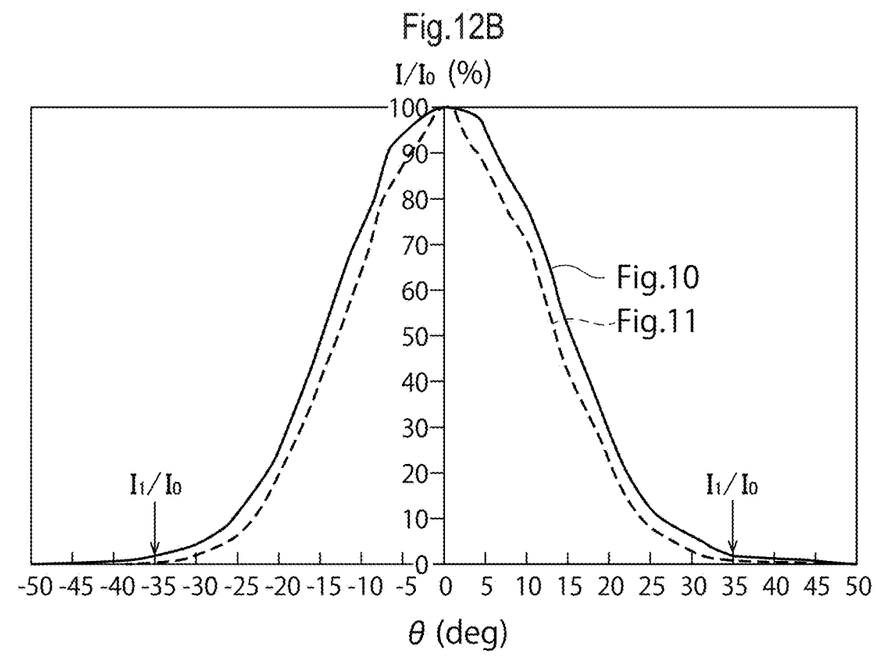
FIG. 12B is a diagram showing the light distributions of FIGS. 10 and 11 represented by the relative luminous intensity.

The simulated light distribution of the side-edge type surface light emitting apparatus 100 of FIG. 10 and the simulated light distribution of the side-edge type surface light emitting apparatus 300 of FIG. 11 are shown in FIGS. 12A and 12B. Note that FIG. 12A is a light distribution represented by the absolute luminous intensity I (cd/m$^2$), and FIG. 12B is a light distribution represented by the relative luminous intensity $I/I_0$ (%) where $I_0$ is the luminous intensity at the azimuth θ=0°.

As illustrated in FIG. 12A, the absolute luminous intensity $I_0$ at the azimuth θ=0° is larger in the side-edge type surface light emitting apparatus 100 of FIG. 10 than the side-edge type surface light emitting apparatus 300 of FIG. 11. The apparatus 100 of FIG. 10 can increase the luminous intensity I at the azimuth θ between −35° and 35°. Also, as illustrated in FIG. 12B, the relative luminous intensity $I_1/I_0$ at the azimuth θ=±35° is smaller in the side-edge type surface light emitting apparatus 100 of FIG. 10 than the side-edge type surface light emitting apparatus 300 of FIG. 11. The apparatus 100 of FIG. 10 can improve the privacy effect.

Figure 13:
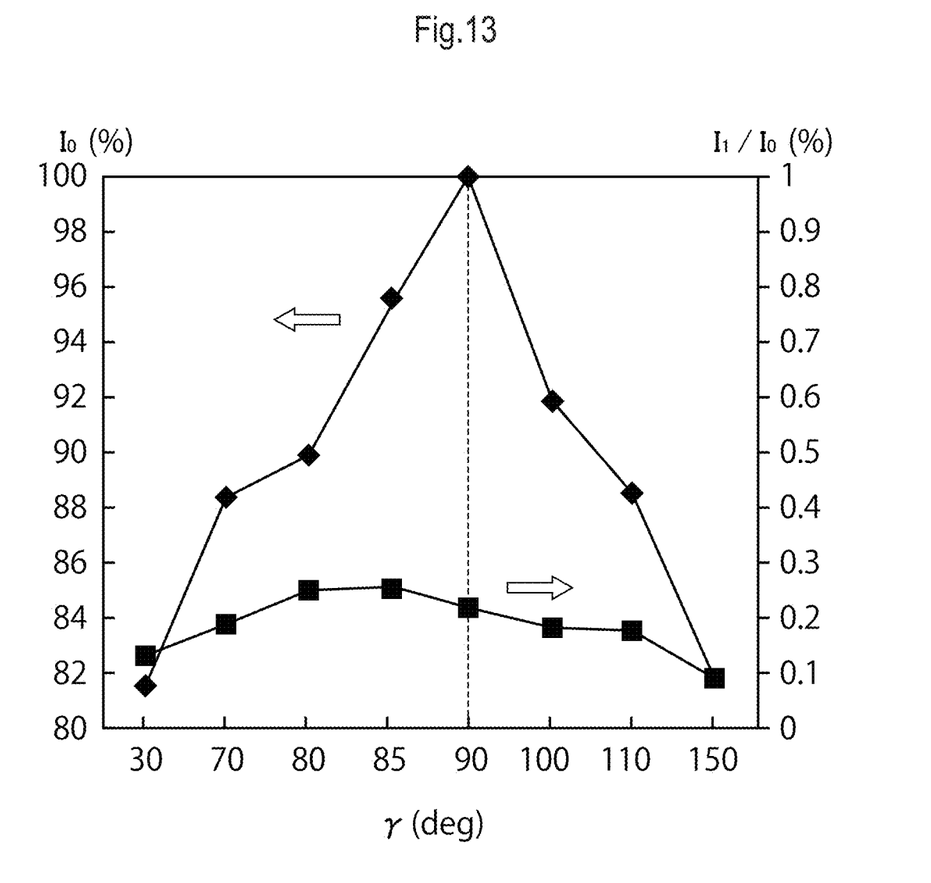
FIG. 13 is a graph showing the luminous intensity and privacy effect with respect to the apical angle of the prisms of the lower prism sheet of FIGS. 8 and 9.

FIG. 13 shows the luminous intensity $I_0$ and privacy effect $I_1/I_0$ with respect to the apical angle γ of the prisms 51 of the lower prism sheet 5 of FIGS. 8 and 9, the luminous intensity $I_0$ at the azimuth θ=0° is defined as 100% when the apical angle γ is 90°. Also, the apical angle α and the curvature radius R of the upper-side prisms 11 of the light guide plate 1 are 100° and 16 μm, respectively.

As illustrated in FIG. 13, when the apical angle γ is 90°, the luminous intensity $I_0$ at the azimuth θ=0° is maximum. Also, when the apical angle γ is 70°~110°, the luminous intensity $I_0$ is larger than 88%, and when the apical angle γ is 85°~100°, the luminous intensity $I_0$ is larger than 90%. On the other hand, when the apical angle γ is 80° to 85°, the privacy effect $I_1/I_0$ is slightly worse. However, even when the apical angle γ is 70° to 110°, the privacy effect is acceptable. Therefore, the apical angle γ of the prisms 51 is 70° to 110°, preferably, 85° to 100°, and more preferably, the apical angle γ of the prisms 51 is 90°.

Figure 14:
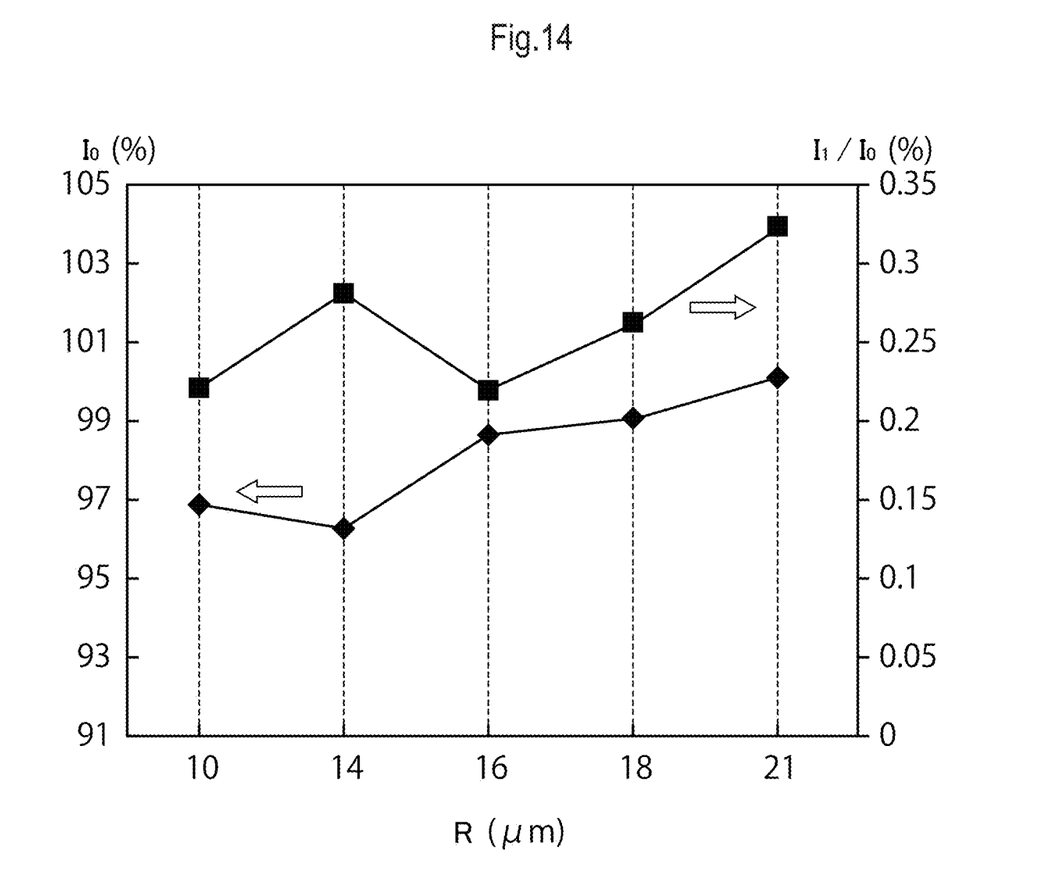
FIG. 14 is a graph showing the luminous intensity and privacy effect with respect to the curvature radius of the upper-side prisms of the light guide plate of FIGS. 3 and 4.

In FIG. 14, shows the luminous intensity $I_0$ and privacy effect $I_1/I_0$ with respect to the curvature radius R of the upper-side prisms 11 of the light guide plate 1 of FIGS. 3 and 4, the luminous intensity $I_0$ at the azimuth θ=0° is defined as 100% when the curvature radius R is 18 μm. Also, the apical angle α of the upper-side prisms 11 of the light guide plate 1 is 100°.

In FIG. 14, in view of the larger luminous intensity $I_0$ and the privacy effect with the smaller ratio $I_1/I_0$, the curvature radius R is 16 μm to 18 μm, and more preferably, the curvature radius R is 16 μm.

Figure 15:
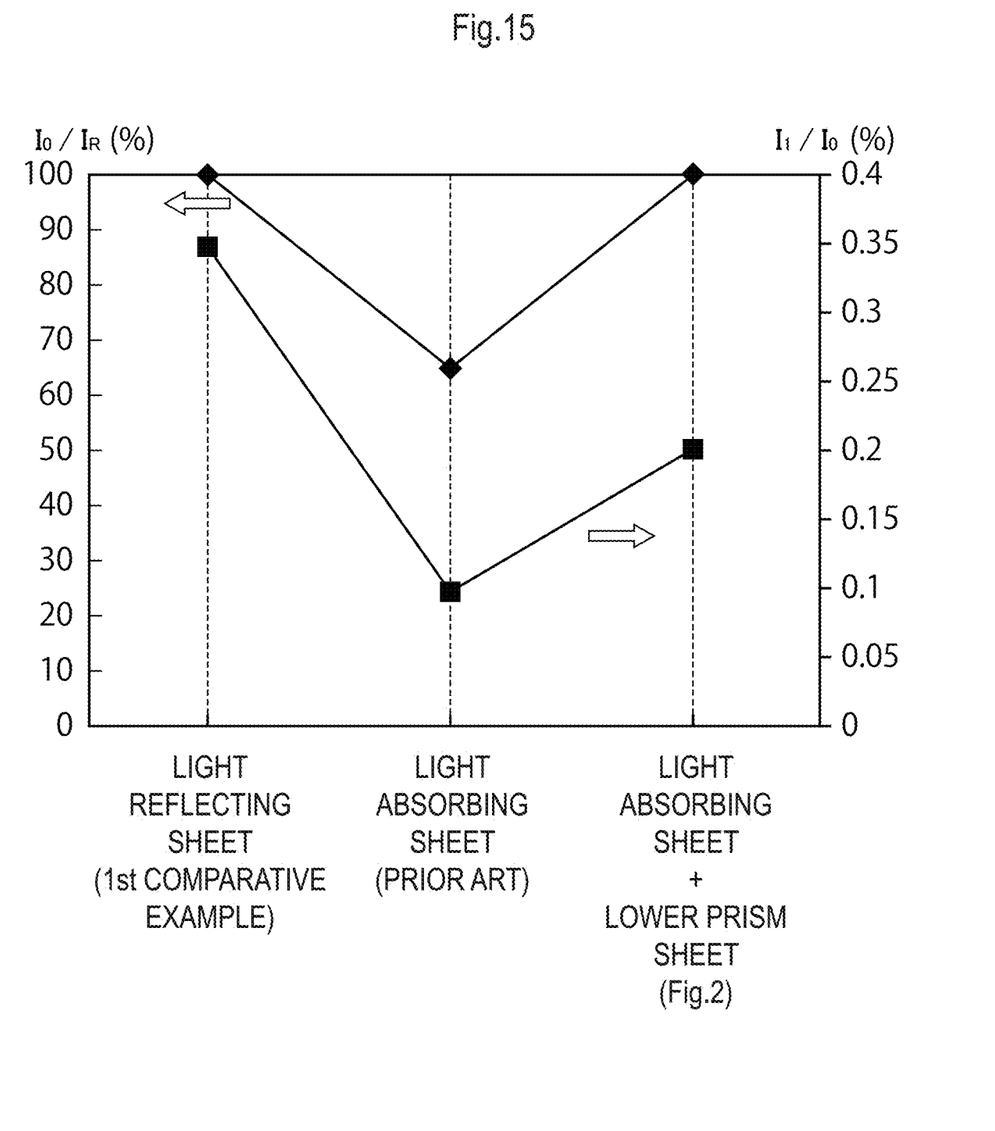
FIG. 15 is a graph showing the luminous intensity and privacy effect in the side-edge type surface light emitting apparatus of FIG. 2 as compared with the first comparative example apparatus and the prior art apparatus.

The luminous intensity $I_0$ and the privacy effect $I_1/I_0$ of the side-edge type surface light emitting apparatus 100 of FIG. 2 are shown in FIG. 15. In this case, the apical angle γ of the lower prism sheet 5 is 90°, and the apical angle α and the curvature radius R of the upper-side prisms 11 of the light guide plate 1 are 100° and 16 μm.

As illustrated in FIG. 15, the luminous intensity $I_0$ is larger than that of the prior art side-edge type surface light emitting apparatus. On the other hand, the privacy effect $I_1/I_0$ slightly deteriorates as compared with the prior art side-edge type surface light emitting apparatus; however, the privacy effect $I_1/I_0$ is sufficiently advantageous over the second comparative example. Therefore, in the side-edge type surface light emitting apparatus 100 of FIG. 2, the privacy effect $I_1/I_0$ can be compatible with the luminous intensity $I_0$.

Figure 16:
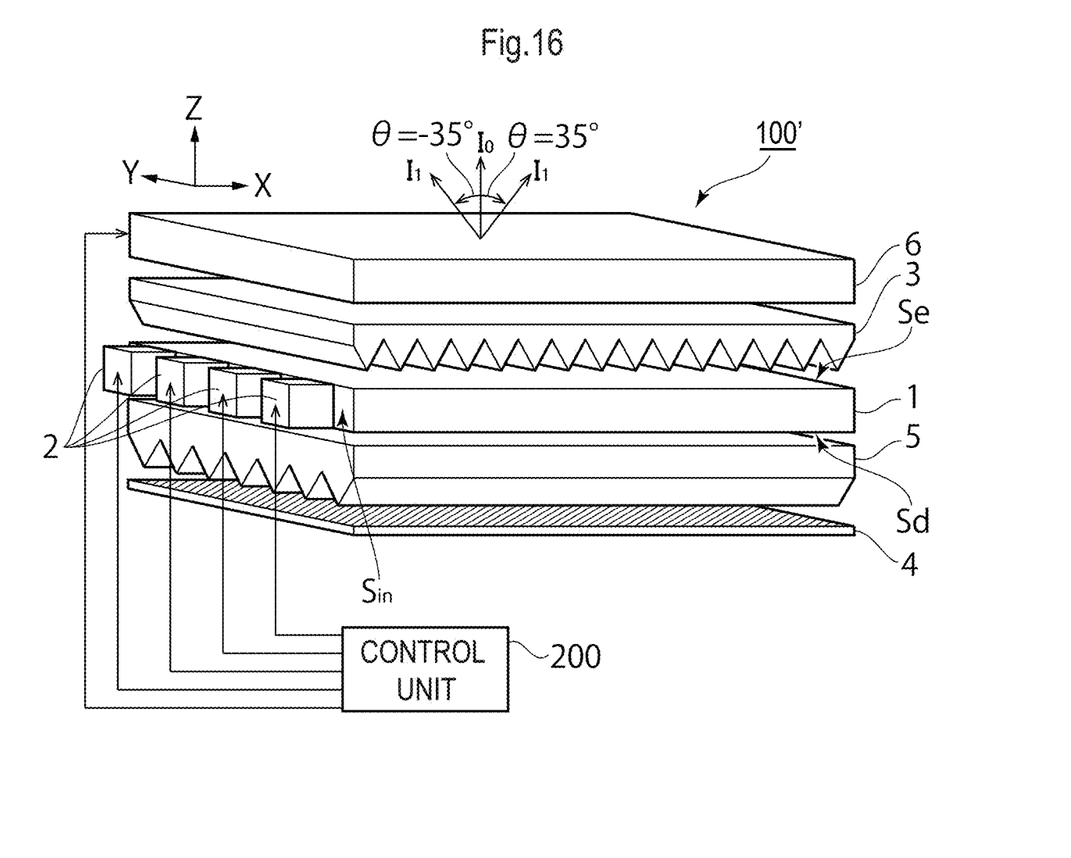
FIG. 16 is a perspective view illustrating a second embodiment of the side-edge type surface light emitting apparatus according to the presently disclosed subject matter.

In FIG. 16, which is a perspective view illustrating a second embodiment of the side-edge type surface light emitting apparatus according to the presently disclosed subject matter, a side-edge type surface light emitting apparatus 100' is constructed by adding a light modulation element 6 to the side-edge type surface light emitting apparatus 100 of FIG. 2. The light modulation element 6 is also controlled by the control unit 200.

The light modulation element 6 is made of polymer dispersed liquid crystal (PDLC) where liquid crystal droplets are dispersed in polymer. When a vertical voltage is applied by the control unit 200 to the light modulation element 6, the directions (director) of the liquid crystal droplets are in parallel with the Z-direction due to the difference in refractive index between the liquid crystal droplets and the polymer, so that the light modulation element 6 is in a light transparent state. In this case, the side-edge type surface light emitting apparatus 100' serves as the side-edge type surface light emitting apparatus 100 of FIG. 2, exhibiting a narrow-viewing characteristic, i.e., an excellent privacy effect. On the other hand, when no vertical voltage is applied to the light modulation element 6, the directions (director) of the liquid crystal droplets are random in the polymer, so that the light modulation element 6 is in a light diffused state. In this case, the side-edge type surface light emitting apparatus 100' serves as a light diffusing layer, exhibiting a wide-viewing characteristic.

Figure 17:
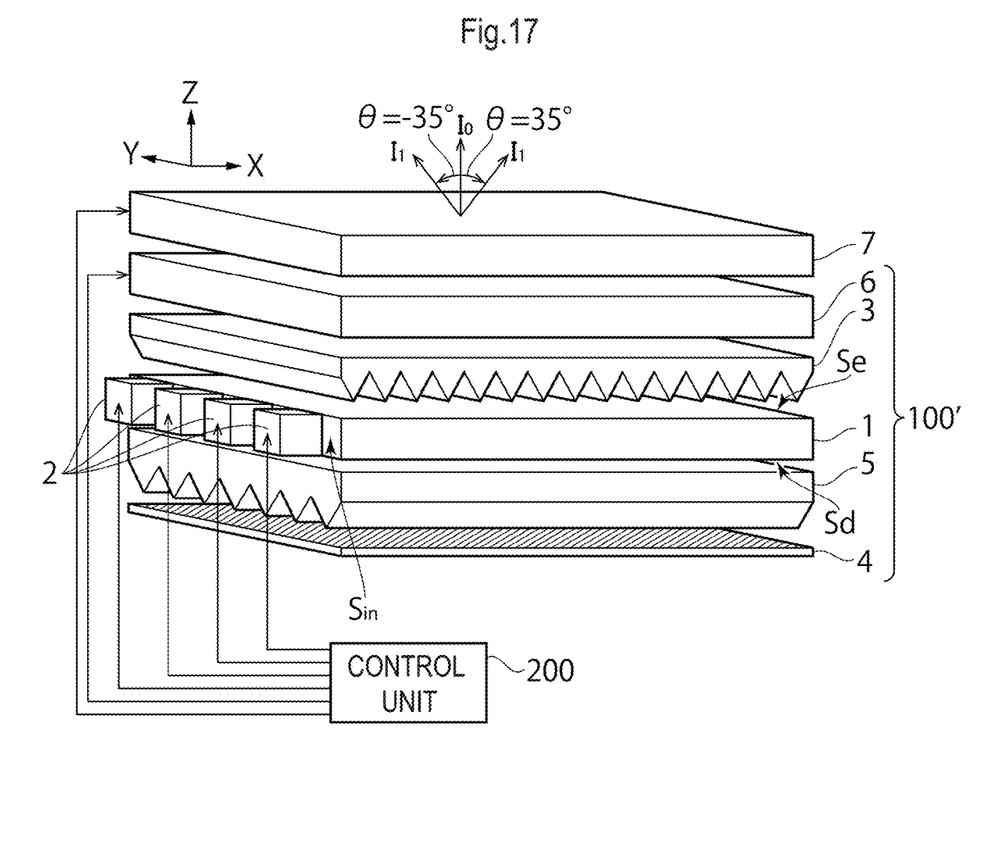
FIG. 17 is a perspective view illustrating an LCD unit to which the side-edge type surface light emitting apparatus of FIG. 16 is applied.

In FIG. 17, which illustrates an LCD unit to which the side-edge type surface light emitting apparatus 100' of FIG. 16 is applied, an LCD panel 7, which is also controlled by the control unit 200, is provided on the light modulation element 6. In this case, the apical angle α and the curvature radius R of the upper-side prisms 11 are 100° and 16 μm, and the apical angle γ of the prisms 51 of the lower prism sheet 5 is 90°.

Figure 18A:
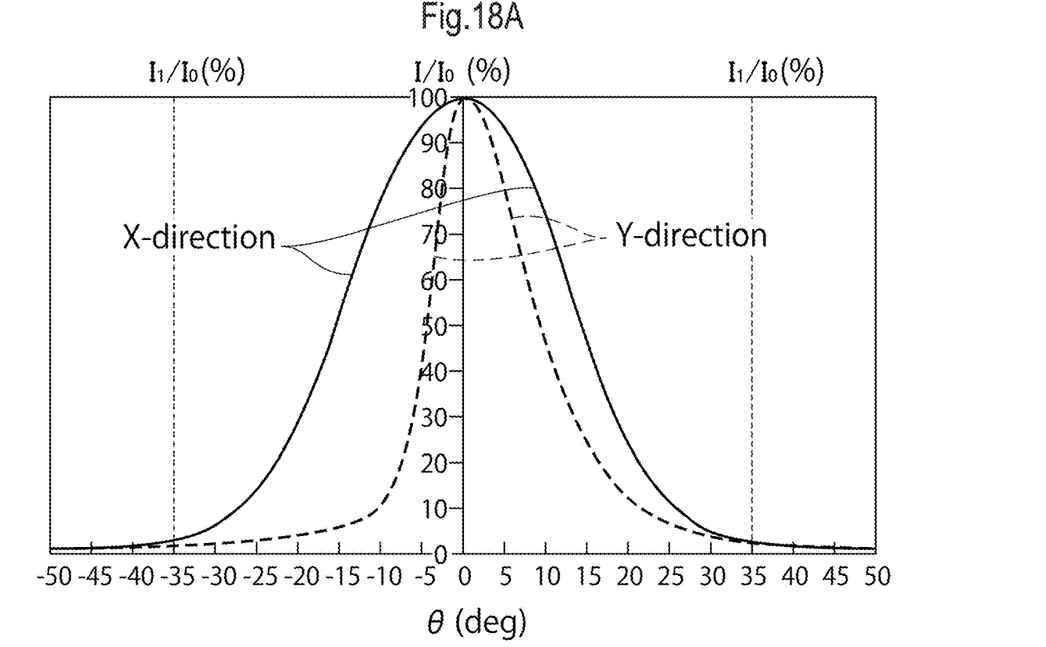
Figure 18B:
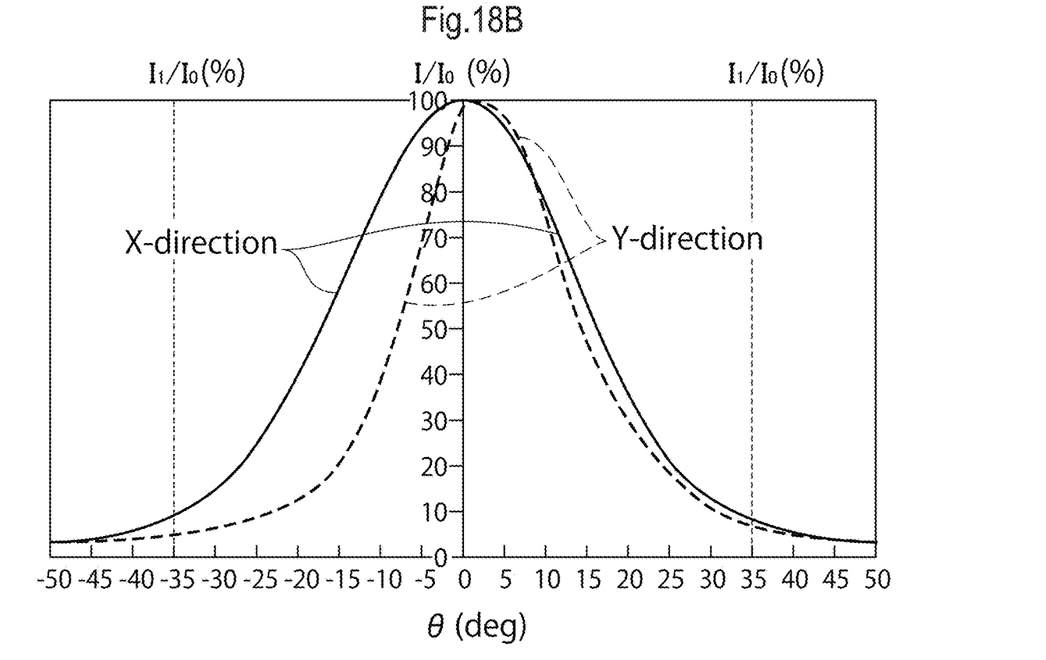
FIG. 18B is a diagram showing the relative light distributions of the LCD unit of FIG. 17 when the light modulation element is turned off.

When the light modulation element 6 is turned on, i.e., a vertical voltage is applied thereto, a relative light distribution is illustrated in FIG. 18A, exhibiting a narrow-viewing characteristic. That is, the privacy effect $I_1/I_0$ (%) at the azimuth θ=±35° is 3.1% in the X-direction and 2.7% in the Y-direction, both of which are sufficiently small. On the other hand, when the light modulation element 6 is turned off, i.e., no vertical voltage is applied thereto, a relative light distribution is illustrated in FIG. 18B, exhibiting a wide-viewing characteristic. That is, the privacy effect $I_1/I_0$ (%) at the azimuth θ=±35° is 8.5% in the X-direction and 7.7% in the Y-direction, both of which are sufficiently large.

In the above-described embodiments, the number of the LED elements 2 can be 1, 2, 3, 5 or more. Also, the LED elements 2 can be replaced by other light sources such as laser-diode (LD) elements. In addition, the LED elements can be replaced by a linear light source such as a cold cathode fluorescence tube and a hot cathode fluorescence tube. Further, the LED elements 2 can be optical fibers receiving light from the light sources.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A side-edge type surface light emitting apparatus comprising:
    a light guide plate having a first light emitting surface on an upper side thereof, a light distribution controlling surface on a lower side thereof, and a light incident surface on sides of said first light emitting surface and said light distribution controlling surface;
    a light source disposed on said light incident surface of said light guide plate;
    a first prism sheet disposed on the upper side of said light guide plate, said first prism sheet having multiple first prisms on a lower side thereof opposing said first light emitting surface of said light guide plate and a second light emitting surface on an upper side thereof;
    a second prism sheet disposed on the lower side of said light guide plate, said second prism sheet having a flat surface on an upper side thereof opposing said light distribution controlling surface of said light guide plate and multiple second prisms on a lower side thereof, said multiple second prisms being perpendicular to said light incident surface of said light guide plate; and
    a light absorbing sheet disposed on the lower side of said second prism sheet and opposing said multiple second prisms of said second prism sheet.

2. The side-edge type surface light emitting apparatus as set forth in claim 1, wherein each of said second prisms has a triangular shape.

3. The side-edge type surface light emitting apparatus as set forth in claim 1, wherein each of said second prisms has a first straight-sloped surface and a second straight-sloped surface symmetrical to said first straight-sloped surface.

4. The side-edge type surface light emitting apparatus as set forth in claim 3, wherein an apical angle between said first and second straight-sloped surfaces is 70° to 110°.

5. The side-edge type surface light emitting apparatus as set forth in claim 1, further comprising a light modulation element provided on said second light emitting surface of said first prism sheet, a state of said light modulation element being selectable between a light transparent state and a light diffused state.

6. The side-edge type surface light emitting apparatus as set forth in claim 1, wherein said light guide plate comprises multiple third prisms on said first light emitting surface perpendicular to said light incident surface.

7. The side-edge type surface light emitting apparatus as set forth in claim 6, wherein each of said third prisms has a cross section of an isosceles triangle with a rounded tip.

8. The side-edge type surface light emitting apparatus as set forth in claim 7, wherein said isosceles triangle has an apical angle of 80° to 110°.

9. A liquid crystal display unit comprising:
    said side-edge type surface light emitting apparatus as set forth in claim 1; and
    a liquid crystal panel on said second light emitting surface of said first prism sheet.

10. The liquid crystal display unit as set forth in claim 9, further comprising a light modulation element provided between said first prism sheet and said liquid crystal panel.

* * * * *